(12) United States Patent
Tajima et al.

(10) Patent No.: US 12,548,860 B2
(45) Date of Patent: Feb. 10, 2026

(54) ELECTRODE PLATE FOR SECONDARY CELL, AND SECONDARY CELL USING SAME

(71) Applicant: SANYO Electric Co., Ltd., Daito (JP)

(72) Inventors: Hiroyuki Tajima, Hyogo (JP); Tetsuya Sato, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 427 days.

(21) Appl. No.: 17/299,717

(22) PCT Filed: Dec. 17, 2019

(86) PCT No.: PCT/JP2019/049490
§ 371 (c)(1),
(2) Date: Jun. 3, 2021

(87) PCT Pub. No.: WO2020/129999
PCT Pub. Date: Jun. 25, 2020

(65) Prior Publication Data
US 2022/0052425 A1    Feb. 17, 2022

(30) Foreign Application Priority Data
Dec. 19, 2018 (JP) ................................. 2018-236842

(51) Int. Cl.
*H01M 50/531* (2021.01)
*H01M 4/02* (2006.01)
(Continued)

(52) U.S. Cl.
CPC ......... *H01M 50/531* (2021.01); *H01M 4/661* (2013.01); *H01M 50/586* (2021.01); *H01M 50/59* (2021.01); *H01M 2004/028* (2013.01)

(58) Field of Classification Search
CPC ......... H01M 2004/028; H01M 50/531; H01M 50/586; H01M 50/59; H01M 4/661
See application file for complete search history.

(56) References Cited

U.S. PATENT DOCUMENTS

| | | |
|---|---|---|
| 9,818,989 B2 | 11/2017 | Cho et al. |
| 2016/0036009 A1 | 2/2016 | Cho et al. |
| 2019/0386285 A1 | 12/2019 | Takahashi et al. |

FOREIGN PATENT DOCUMENTS

| | | |
|---|---|---|
| JP | 2005-11556 A | 1/2005 |
| JP | 2005-71964 A | 3/2005 |

(Continued)

OTHER PUBLICATIONS

Machine translation of WO 2018154913 A1 (Year: 2018).*

(Continued)

*Primary Examiner* — Matthew T Martin
(74) *Attorney, Agent, or Firm* — WHDA, LLP (57) ABSTRACT

The present invention provides a secondary cell having high reliability. A positive electrode plate for a secondary cell having a positive electrode core body made of metal, and a positive electrode active material layer formed on both surfaces of the positive electrode core body, wherein the positive electrode plate has a first edge side of the positive electrode core body, and in the positive electrode tab, the thickness of the end of the positive electrode core body near the first edge side is less than the thickness of the end of the positive electrode core body in the first edge side.

4 Claims, 6 Drawing Sheets

(51) Int. Cl.
*H01M 4/66* (2006.01)
*H01M 50/586* (2021.01)
*H01M 50/59* (2021.01)

(56) References Cited

FOREIGN PATENT DOCUMENTS

| | | |
|---|---|---|
| JP | 2005-339939 A | 12/2005 |
| JP | 2013-026123 A | 2/2013 |
| JP | 2016-33912 A | 3/2016 |
| JP | 2016-115409 A | 6/2016 |
| NO | 2018/154913 A1 | 8/2018 |
| WO | 2017/057012 A1 | 4/2017 |

OTHER PUBLICATIONS

Extended (Supplementary) European Search Report dated Dec. 16, 2021, issued in counterpart EP application No. 19899303.2. (6 pages).
International Search Report dated Mar. 10, 2020, issued in counterpart International Application No. PCT/JP2019/049490. (2 pages).
English Translation of Chinese Search Report dated Sep. 1, 2022, issued in counterpart CN application No. 201980071296.7. (2 pages).

\* cited by examiner

ELECTRODE PLATE FOR SECONDARY CELL, AND SECONDARY CELL USING SAME

TECHNICAL FIELD

The present invention relates to an electrode plate for a secondary battery and a secondary battery using the same.

BACKGROUND ART

Secondary batteries, such as alkaline secondary batteries and non-aqueous electrolyte secondary batteries, are used in the driving power sources of electric vehicles (EV) and hybrid electric vehicles (HEV or PHEV).

These secondary batteries contain an electrode assembly consisting of a positive electrode plate, a negative electrode plate, and a separator together with an electrolyte in a battery case. The battery case is composed of an exterior body having an opening and a sealing plate that seals the opening of the exterior body. A positive electrode terminal and a negative electrode terminal are attached to the sealing plate. The positive electrode terminal is electrically connected to the positive electrode plate with a positive electrode current collector therebetween, and the negative electrode terminal is electrically connected to the negative electrode plate with a negative electrode current collector therebetween.

As such a secondary battery, a secondary battery has been proposed in which a positive electrode tab group consisting of a plurality of positive electrode tabs and a negative electrode tab group consisting of a plurality of negative electrode tabs are provided at the end of the electrode assembly adjacent to the sealing plate (see Patent Literature 1).

CITATION LIST

Patent Literature

PATENT LITERATURE 1: Japanese Unexamined Patent Application Publication No. 2016-115409

SUMMARY

It is an advantage of the present invention is to provide a highly reliable secondary battery in which short circuits between the positive electrode plate and the negative electrode plate are suppressed.

A secondary battery electrode plate according to one aspect of the present invention has a metal core body and an active material layer on both sides of the core body, wherein the electrode plate has a first side and a tab that protrudes from the first side, the tab is a part of the core body, and the thickness of an end of the core body near the first side in the tab is smaller than the thickness of an end of the core body on the first side.

A secondary battery according to one aspect of the present invention comprises: the secondary battery electrode plate; another electrode plate that has a polarity different from that of the electrode plate; and a current collector electrically connected to the electrode plate, wherein the tab is connected to the current collector in a curved state.

According to the present invention, a highly reliable secondary battery can be provided.

DESCRIPTION OF EMBODIMENTS

The configuration of a square secondary battery 20 as a secondary battery according to the embodiment will be described below. Note that the present invention is not limited to the following embodiments.

Figure 1:
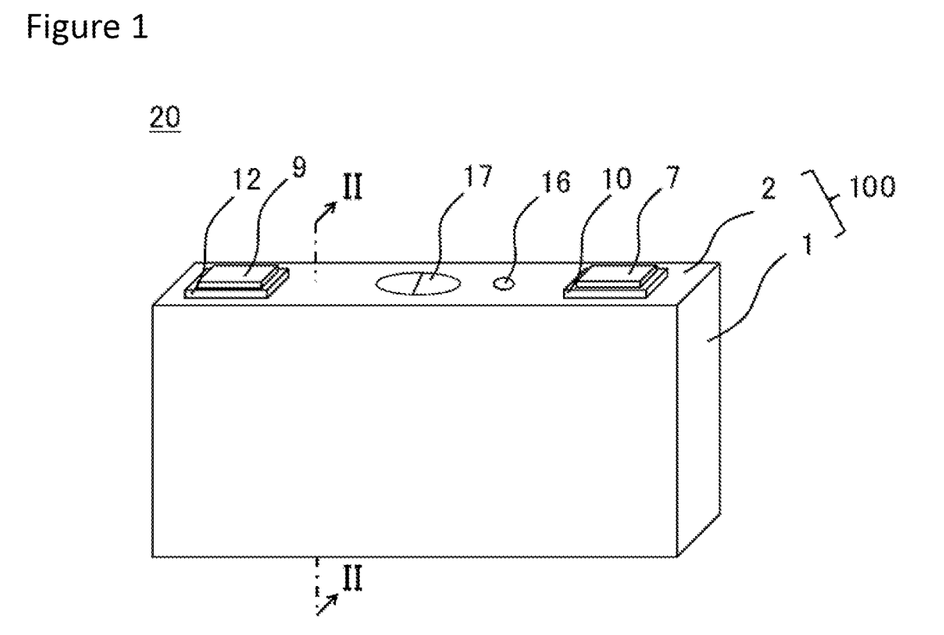
FIG. 1 is a perspective view of a secondary battery according to an embodiment.
Figure 2:
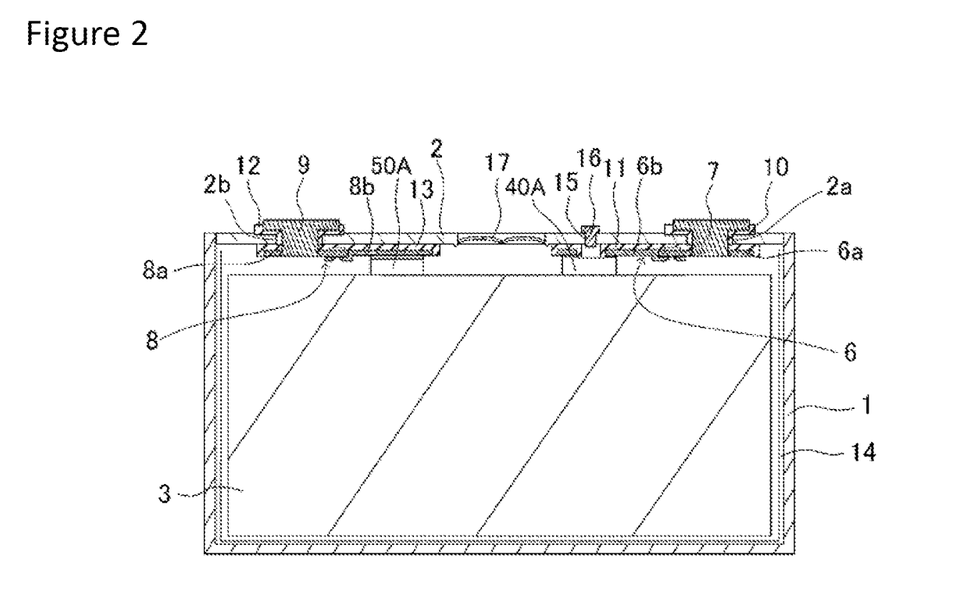
FIG. 2 is a cross-sectional view taken along line II-II in FIG. 1.

As shown in FIGS. 1 and 2, the square secondary battery 20 comprises a battery case 100 consisting of a bottomed hollow rectangular cylindrical exterior body 1 having an opening and a sealing plate 2 for sealing the opening of the square exterior body 1. The square exterior body 1 and the sealing plate 2 are preferably made of metal. An electrode assembly 3 including a positive electrode plate and a negative electrode plate is accommodated in the square exterior body 1 together with an electrolyte.

At the end of the electrode assembly 3 adjacent to the sealing plate 2, a positive electrode tab group 40A composed of a plurality of positive electrode tabs 40 and a negative electrode tab group 50A composed of a plurality of negative electrode tabs 50 are provided. The positive electrode tab group 40A is electrically connected to a positive electrode terminal 7 via a second positive electrode current collector 6b and a first positive electrode current collector 6a. The negative electrode tab group 50A is electrically connected to a negative electrode terminal 9 via a second negative electrode current collector 8b and a first negative electrode current collector 8a. The first positive electrode current collector 6a and the second positive electrode current collector 6b constitute a positive electrode current collector 6. Note that the positive electrode current collector 6 may be used as one component. The first negative electrode current collector 8a and the second negative electrode current collector 8b constitute a negative electrode current collector 8. Note that the negative electrode current collector 8 may be used as one component.

The first positive electrode current collector 6a, the second positive electrode current collector 6b, and the positive electrode terminal 7 are preferably made of metal, and more preferably made of aluminum or an aluminum alloy. A resin external insulating member 10 is disposed between the positive electrode terminal 7 and the sealing plate 2. A resin internal insulating member 11 is disposed between the first positive electrode current collector 6a and the second positive electrode current collector 6b, and the sealing plate 2.

The first negative electrode current collector 8a, the second negative electrode current collector 8b, and the negative electrode terminal 9 are preferably made of metal, more preferably copper or a copper alloy. The negative electrode terminal 9 preferably has a portion of aluminum or an aluminum alloy and a portion of copper or a copper alloy. In this case, the portion of copper or a copper alloy is preferably connected to the first negative electrode current collector 8a so that the portion of aluminum or an aluminum alloy protrudes to the outside of the sealing plate 2. A resin external insulating member 12 is disposed between the negative electrode terminal 9 and the sealing plate 2. A resin internal insulating member 13 is disposed between the first negative electrode current collector 8a and the second negative electrode current collector 8b, and the sealing plate 2.

An electrode assembly holder 14 composed of a resin sheet, which is made of resin, is disposed between the electrode assembly 3 and the square exterior body 1. The electrode assembly holder 14 is preferably formed by bending a resin insulating sheet into a bag shape or a box shape. The sealing plate 2 has an electrolytic solution injection hole 15, and the electrolytic solution injection hole 15 is sealed by a sealing member 16. The sealing plate 2 has a gas discharge valve 17 that breaks when the pressure inside the battery case 100 exceeds a predetermined value to discharge the gas inside the battery case 100 to the outside of the battery case 100.

A method of manufacturing the square secondary battery 20 and the details of each component will now be explained.

[Positive Electrode Plate]

The method of manufacturing the positive electrode plate will be first explained.

[Preparation of Positive Electrode Active Material Layer Slurry]

Lithium nickel manganese cobalt oxide as a positive electrode active material, polyvinylidene fluoride (PVdF) as a binder, a carbon material as a conductive agent, and N-methyl-2-pyrrolidone (NMP) as a dispersion medium are mixed so that the lithium nickel manganese cobalt oxide:PVdF:carbon material mass ratio becomes 97.5:1:1.5, thereby preparing a positive electrode active material layer slurry.

[Preparation of Positive Electrode Protective Layer Slurry]

Alumina powder, a carbon material as a conductive material, polyvinylidene fluoride (PVdF) as a binder, and N-methyl-2-pyrrolidone (NMP) as a dispersion medium are mixed so that the alumina powder:carbon material:PVdF mass ratio becomes 83:3:14, thereby preparing a protective layer slurry.

[Formation of Positive Electrode Active Material Layer and Positive Electrode Protective Layer]

The positive electrode active material layer slurry and the positive electrode protective layer slurry prepared by the aforementioned method are applied to both sides of an aluminum foil as a positive electrode core body having a thickness of 15 μm with a die coater. At this time, the positive electrode active material layer slurry is applied to the center of the positive electrode core body with respect to the width direction. Further, the positive electrode protective layer slurry is applied to both ends with respect to the width direction of the region coated with the positive electrode active material layer slurry.

The positive electrode core body coated with the positive electrode active material layer slurry and the positive electrode protective layer slurry is dried to remove NMP contained in the positive electrode active material layer slurry and the positive electrode protective layer slurry. Thus, a positive electrode active material layer and a protective layer are formed. After that, the positive electrode active material layer is compressed into a positive electrode original plate 400 by passing it between a pair of press rollers.

Figure 3:
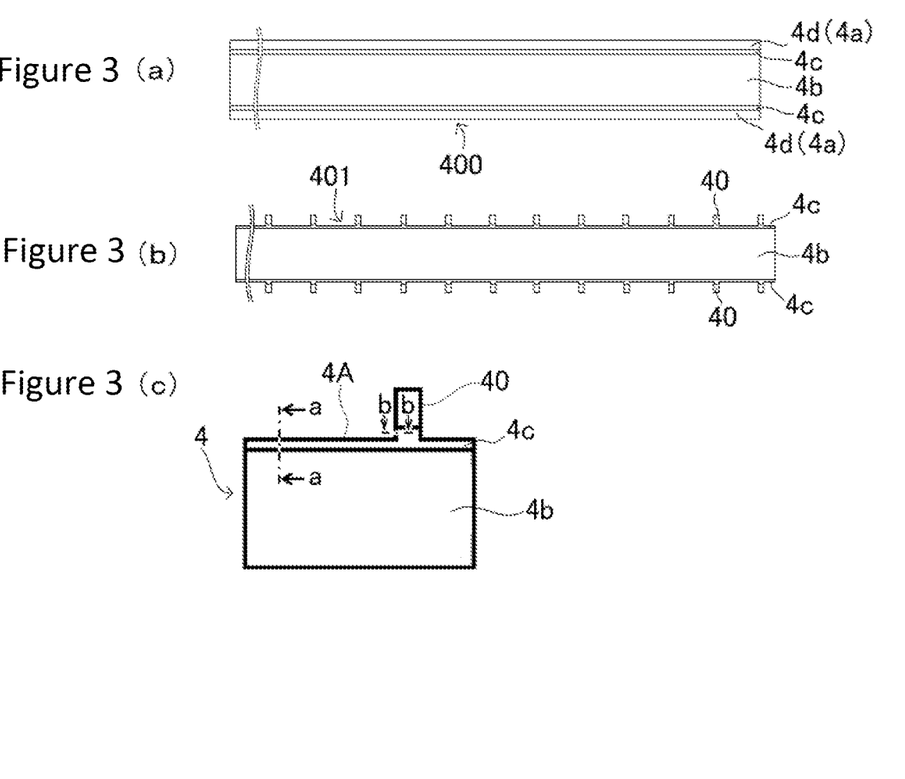
FIG. 3A is a plan view of a positive electrode original plate.
FIG. 3B is a plan view of the positive electrode original plate with tabs already formed.
FIG. 3C is a plan view of the positive electrode plate.

FIG. 3A is a plan view of the positive electrode original plate 400 fabricated by the aforementioned method. A positive electrode active material layer 4b is formed on both sides of a strip-shaped positive electrode core body 4a along the longitudinal direction of the positive electrode core body 4a. In the positive electrode core body 4a, a positive electrode protective layer 4c is formed near both ends with respect to the width direction of the region where the positive electrode active material layer 4b is formed. A positive electrode core body exposed portion 4d is formed at both ends of the positive electrode original plate 400 with respect to the width direction of the positive electrode original plate 400 along the longitudinal direction. Note that the thickness of the positive electrode active material layer 4b is preferably larger than the thickness of the positive electrode protective layer 4c. The thickness of the positive electrode protective layer 4c formed on one side of the positive electrode core body 4a is preferably 10 to 100 μm, more preferably 15 to 50 μm.

FIG. 3B is a plan view of the positive electrode original plate 401 with tabs already formed. Cutting the positive electrode core body exposed portion 4d of the positive electrode original plate 400 into a predetermined shape leaves the positive electrode original plate 401 with tabs already formed. When the positive electrode original plate 400 is cut to form tabs, the positive electrode original plate 400 is preferably cut by irradiating energy rays such as laser beams.

It is preferable to use a continuous oscillation (CW) laser for laser cutting. The output of the laser is preferably 500 W to 1200 W, more preferably 550 W to 1000 W, and even more preferably 600 W to 1000 W. The scanning speed of the laser is preferably 100 mm/s to 5000 mm/s. However, this is not necessarily the case. Note that a pulsed laser may be used instead.

In the positive electrode original plate 401 with tabs already formed, there are a plurality of positive electrode tabs 40 at both ends of the positive electrode original plate 401 with respect to the width direction with tabs already formed. Each positive electrode tab 40 is composed of a positive electrode core body exposed portion 4d. As shown in FIG. 3B, the positive electrode original plate 400 can be cut so that the positive electrode protective layer 4c remains at the base of each positive electrode tab 40 and at sides of the positive electrode original plate 401 obtained between the adjacent positive electrode tabs 40 with tabs already formed.

FIG. 3C is a plan view of the positive electrode plate 4. First, the positive electrode original plate 401 with tabs already formed is cut at the central portion with respect to the width direction along the longitudinal direction of the positive electrode original plate 401 with tabs already formed. After that, the positive electrode original plate 401 with tabs already formed is cut at predetermined intervals in the longitudinal direction of the positive electrode original plate 401 with tabs already formed, thereby fabricating the positive electrode plate 4. The positive electrode original plate 401 with tabs already formed can be cut by laser cutting, cutting using a mold or a cutter, or the like. The positive electrode original plate 401 with tabs already formed is preferably cut by a mold or a cutter. As for the positive electrode plate 4, a positive electrode tab 40, which is a part of the positive electrode core body 4a, protrudes from the first side 4A of the positive electrode plate 4.

Figure 4:
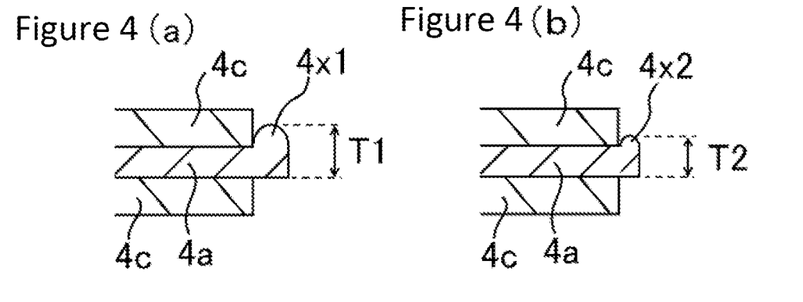
FIG. 4A is a cross-sectional view taken along line aa in FIG. 3C.
FIG. 4B is a cross-sectional view taken along line bb in FIG. 3C.

FIG. 4A is a cross-sectional view taken along line aa in FIG. 3C, and is a cross-sectional view of the first side 4A of the positive electrode plate 4 from which the positive electrode tab 40 protrudes.

FIG. 4B is a cross-sectional view taken along line bb in FIG. 3C, and is a cross-sectional view of a portion of the positive electrode tab 40 near the first side 4A.

As shown in FIG. 4A, the positive electrode plate 4 has an active material layer-free region in which the positive electrode active material layer 4b is not formed along the first side 4A in the positive electrode core body 4a. In the active material layer-free region, a positive electrode protective layer 4c is formed adjacent to the positive electrode active material layer 4b. A protrusion 4x1 that protrudes from one side of the positive electrode core body 4a (upper side in FIG. 4A) in the thickness direction of the positive electrode core body 4a is formed at the end of the active material layer-free region. Hence, the thickness T1 of the end of the positive electrode core body 4a on the first side 4A is larger than the thickness of the portion of the positive electrode core body 4a where the positive electrode active material layer 4b is formed on the surface. Note that the thickness of the portion of the positive electrode core body 4a where the positive electrode active material layer 4b is formed on the surface is substantially equal to the thickness of the portion of the positive electrode core body 4a where the positive electrode protective layer 4c is formed on the surface. The protrusion 4x1 is a part where the positive electrode core body 4a is melted and solidified by laser cutting. The protrusion 4x1 is likely to occur on the side of the positive electrode core body 4a irradiated with the laser beam during laser cutting.

As shown in FIG. 4B, in the positive electrode tab 40, a protrusion 4x2 that protrudes from one side of the positive electrode core body 4a (upper side in FIG. 4B) in the thickness direction of the positive electrode core body 4a is formed at the end of the positive electrode core body 4a near the first side 4A. Hence, in the positive electrode tab 40, the thickness T2 of the end of the positive electrode core body 4a near the first side 4A of is larger than the thickness of the portion of the positive electrode core body 4a where the positive electrode active material layer 4b is formed on the surface. The protrusion 4x2 is a part where the positive electrode core body 4a is melted and solidified by laser cutting. The protrusion 4x2 is likely to occur on the side of the positive electrode core body 4a irradiated with the laser beam during laser cutting.

In the positive electrode tab 40, the thickness T2 of the end of the positive electrode core body 4a near the first side 4A is smaller than the thickness T1 of the end of the positive electrode core body 4a in the first side 4A. With such a configuration, the protrusion height T2 of the protrusion 4x2 is relatively small, so that even when the curved positive electrode tab 40 is connected to the positive electrode current collector, stress is concentrated on the protrusion 4x2 and the protrusion 4x2 can be effectively prevented from detaching from the positive electrode tab 40.

Further, since the protrusion height T2 of the protrusion 4x2 is relatively small, even if the distance between the separator adjacent to a portion of the positive electrode tab 40 close to the first side 4A and the negative electrode plate 5 is made short by curving the positive electrode tab 40, it is possible to effectively prevent damage to the separator and short circuits between the positive electrode tab 40 and the negative electrode plate 5.

As for the positive electrode tab 40, a conceivable way of making the thickness T2 of the end of the positive electrode core body 4a near the first side 4A smaller than the thickness T1 of the end of the positive electrode core body 4a at the first side is to make the laser output for cutting a portion to be the end of the positive electrode tab 40 smaller than the laser output for cutting a portion to be the first side 4A, when laser-cutting the positive electrode original plate 400. Another conceivable way is to make the laser scanning speed for cutting a portion to be the end of the positive electrode tab 40 higher than the laser scanning speed for cutting a portion to be the first side 4A, when laser-cutting the positive electrode original plate 400.

Figure 6:
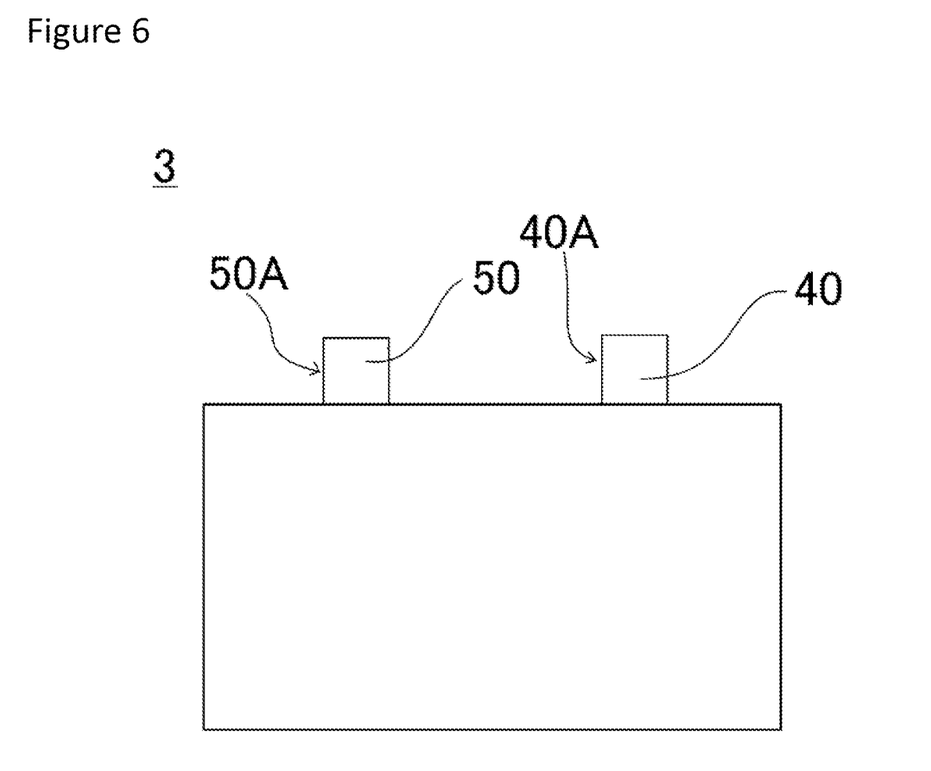
FIG. 6 is a plan view of an electrode assembly according to the embodiment.

In a plan view of the electrode assembly 3 in the status of the electrode assembly 3, the thickness of the end of the positive electrode core body 4a in the portion of the positive electrode tab 40 overlapping the negative electrode plate 5 is preferably made smaller than the thickness T1 of the end of the positive electrode core body 4a at the first side 4A.

When the positive electrode protective layer 4c is formed near the first side 4A of the positive electrode tab 40, the thickness of the end of the positive electrode core body 4a is preferably made smaller than the thickness T1 of the end of the positive electrode core body 4a on the first side 4A in the direction in which the positive electrode tab 40 protrudes (vertical direction in FIG. 3C) in the region from the first side 4A to the positive electrode protective layer 4c up to the distal end of the positive electrode tab 40.

From one side of the positive electrode core body 4a (upper side in FIG. 4A), the protrusion 4x1 protrudes in the direction of the thickness of the positive electrode core body 4a. Here, the height from one side of the positive electrode core body 4a (upper side in FIG. 4A) to the upper end of the protrusion 4x1 is defined as the protrusion height of the protrusion 4x1. The protrusion height of the protrusion 4x1 is preferably smaller than the thickness of the positive electrode protective layer 4c. Such a configuration makes it possible to more effectively prevent the protrusion 4x1 from coming into contact with the separator and damaging the separator. The protrusion height of the protrusion 4x1 is preferably ⅔ or less, more preferably ⅓ or less of the thickness of the positive electrode protective layer 4c. Note that the protrusion height of the protrusion 4x1 can be made larger than the thickness of the positive electrode protective layer 4c. The positive electrode protective layer 4c is not an essential component. The positive electrode protective layer 4c is not necessarily provided on the positive electrode plate 4.

Note that the protrusion height of the protrusion 4x1 is preferably ¼ or less of the thickness of the portion of the positive electrode core body 4a where the positive electrode active material layers 4b are formed on both sides.

In the positive electrode core body 4a, on the other side (lower side in FIG. 4A) that is the side opposite to the side on which the protrusion 4x1 is formed, no protrusion protruding from the other side in the thickness direction of positive electrode core body 4a is preferably formed. Alternatively, in the positive electrode core body 4a, on the other side (lower side in FIG. 4A) that is the side opposite to the side on which the protrusion 4x1 is formed, a protrusion that protrudes from the other side in the thickness direction of the positive electrode core body 4a is preferably formed but its protrusion height is preferably smaller than that of the protrusion 4x1. With such a configuration, short circuits between the positive electrode plate 4 and the negative electrode plate 5 can be prevented more effectively. Note that the protrusion height of the protrusion formed on the other side is preferably 1/3 or less, more preferably 1/5 or less of the protrusion height of the protrusion 4x1.

[Negative Electrode Plate]

A method of manufacturing a negative electrode plate will now be explained.

[Preparation of Negative Electrode Active Material Layer Slurry]

Graphite as a negative electrode active material, styrene-butadiene rubber (SBR) and carboxymethyl cellulose (CMC) as a binder, and water as a dispersion medium are mixed so that the graphite:SBR:CMC mass ratio becomes 98:1:1, thereby preparing a negative electrode active material layer slurry.

[Formation of Negative Electrode Active Material Layer]

The negative electrode active material layer slurry prepared by the aforementioned method is applied to both sides of a 8-μm-thick copper foil as the negative electrode core body with a die coater.

The negative electrode core body coated with the negative electrode active material layer slurry is dried to remove the water contained in the negative electrode active material layer slurry. Thus, the negative electrode active material layer is formed. After that, the negative electrode active material layer is compressed into the negative electrode original plate 500 by passing it between the pair of press rollers.

Figure 5:
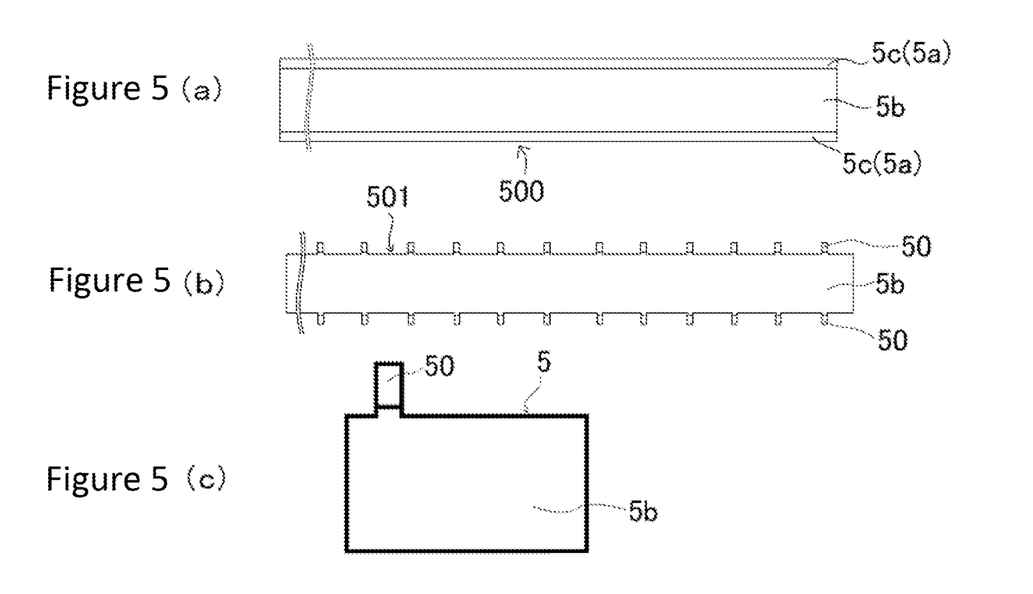
FIG. 5A is a plan view of a negative electrode original plate.
FIG. 5B is a plan view of the negative electrode original plate with tabs already formed.
FIG. 5C is a plan view of the negative electrode plate.

FIG. 5A is a plan view of the negative electrode original plate 500 fabricated by the aforementioned method. Negative electrode active material layers 5b are formed on both sides of a strip-shaped negative electrode core body 5a along the longitudinal direction of the negative electrode core body 5a. Negative electrode core body exposed portions 5c are formed at both ends of the negative electrode original plate 500 with respect to the width direction along the longitudinal direction of the negative electrode original plate 500.

FIG. 5B is a plan view of a negative electrode original plate 501 with tabs already formed. The negative electrode original plate 501 with tabs already formed is fabricated by cutting the negative electrode core body exposed portion 5c of the negative electrode original plate 501 with tabs already formed, into a predetermined shape. The negative electrode original plate 500 can be cut by irradiation with energy rays such as lasers, a mold, a cutter, or the like. As for the negative electrode original plate 501 with tabs already formed, a plurality of negative electrode tabs 50 are formed at both ends with respect to the width direction of the negative electrode original plate 501 with tabs already formed. Note that each negative electrode tabs 50 consists of a negative electrode core body exposed portion 5c. The negative electrode original plate 500 is preferably cut by irradiation with energy rays to form the negative electrode tabs 50.

FIG. 5C is a plan view of the negative electrode plate 5. First, the negative electrode original plate 501 with tabs already formed is cut at the central portion with respect to the width direction along the longitudinal direction of the negative electrode original plate 501 with tabs already formed. After that, the negative electrode original plate 501 with tabs already formed is cut at predetermined intervals in the longitudinal direction of the negative electrode original plate 501 with tabs already formed, thereby fabricating the negative electrode plate 5.

[Fabrication of Electrode Assembly]

The positive electrode plate 4 and the negative electrode plate 5 fabricated by the aforementioned method are laminated with a separator therebetween, thereby manufacturing a laminated electrode assembly 3. FIG. 6 is a plan view of the electrode assembly 3. A positive electrode tab group 40A of positive electrode tabs 40 and a negative electrode tab group 50A of negative electrode tabs 50 are provided at one end of the electrode assembly 3.

Note that the area of the region of the positive electrode plate 4 in which the positive electrode active material layer 4b is formed in a plan view is preferably smaller than the area of the region of the negative electrode plate 5 in which the negative electrode active material layer 5b is formed in a plan view. In a plan view of the electrode assembly 3, all the regions of the positive electrode plate 4 in which the positive electrode active material layer 4b is formed are preferably located in the regions of the negative electrode plate 5 where the negative electrode active material layer 5b is formed.

In the electrode assembly 3, the end of the positive electrode protective layer 4c formed on the positive electrode tab 40 adjacent to the distal end of the positive electrode tab 40 is preferably located closer to the distal end of the positive electrode tab 40 than the side of the negative electrode plate 5 on which the negative electrode tab 50 is formed. In other words, in the negative electrode plate 5, in the region on the side on which the negative electrode tab 50 is formed facing the positive electrode tab 40, the positive electrode protective layer 4c resides between the positive electrode core body 4a constituting the positive electrode tab 40 and the negative electrode plate 5. This prevents short circuits between the positive electrode plate 4 and the negative electrode plate 5 more effectively.

It is preferable to use a porous film of polyolefin as the separator. It is more preferable to use a separator in which a heat-resistant layer containing ceramic is formed on the surface of the porous film of polyolefin.

[Connection Between Current Collector and Tabs]

Figure 7:
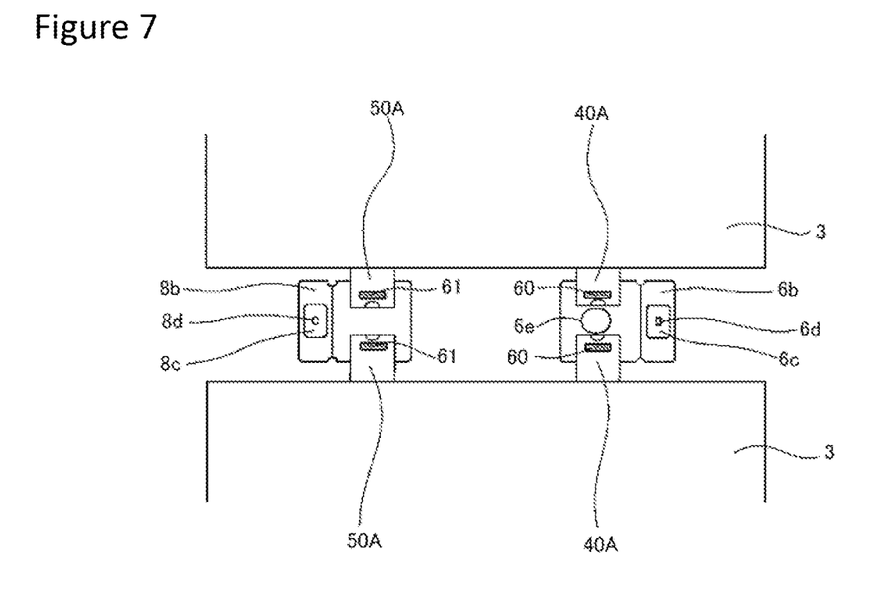
FIG. 7 is a diagram showing a state in which a positive electrode tab group is connected to a second positive electrode current collector and a negative electrode tab group is connected to a second negative electrode current collector.

As shown in FIG. 7, the positive electrode tab groups 40A of the two electrode assemblies 3 are connected to the second positive electrode current collector 6b, and the negative electrode tab groups 50A of the two electrode assemblies 3 are connected to the second negative electrode current collector 8b. The positive electrode tab groups 40A are welded and joined to the second positive electrode current collector 6b, thereby forming a welded connection portion 60. The negative electrode tab groups 50A are welded and joined to the second negative electrode current collector 8b, thereby forming a welded connection portion 61.

A thin portion 6c is formed in the second positive electrode current collector 6b, and a current collector opening 6d is formed in the thin portion 6c. In the thin portion 6c, the second positive electrode current collector 6b is connected to the first positive electrode current collector 6a. In the second positive electrode current collector 6b, a current collector through hole 6e is formed in a position facing the electrolytic solution injection hole 15 of the sealing plate 2.

A thin portion 8c is formed in the second negative electrode current collector 8b, and a current collector opening 8d is formed in the thin portion 8c. In the thin portion 8c, the second negative electrode current collector 8b is connected to the first negative electrode current collector 8a.

A connection between the positive electrode tab group 40A and the second positive electrode current collector 6b, and a connection between the negative electrode tab group 50A and the second negative electrode current collector 8b can be achieved by ultrasonic welding, resistance welding, laser welding, or the like.

[Mounting of Components to Sealing Plate]

Figure 8:
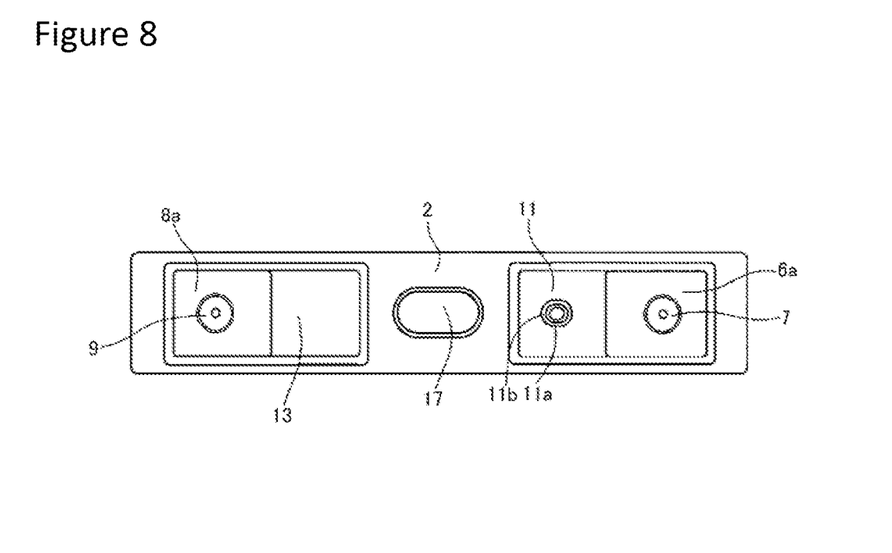
FIG. 8 is a diagram showing a surface of a sealing plate adjacent to the electrode assembly after the first positive electrode current collector and the first negative electrode current collector are attached to the sealing plate.

FIG. 8 is a diagram showing the inner side of the battery of the sealing plate 2 mounted with the components. Each component is mounted to the sealing plate 2 in the following manner.

An external insulating member 10 is located on the outer side of the battery around the positive electrode terminal insertion hole 2a of the sealing plate 2. An internal insulating member 11 and a first positive electrode current collector 6a are located on the inner side of the battery around the positive electrode terminal insertion hole 2a of the sealing plate 2. After that, the positive electrode terminal 7 is inserted from the outside of the battery into the through hole of the external insulating member 10, the positive electrode terminal insertion hole 2a of the sealing plate 2, the through hole of the internal insulating member 11, and the through hole of the first positive electrode current collector 6a, and the end of the positive electrode terminal 7 is crimped onto the first positive electrode current collector 6a. Hence, the positive electrode terminal 7 and the first positive electrode current collector 6a are fixed to the sealing plate 2. Note that the crimped portion of the positive electrode terminal 7 and the first positive electrode current collector 6a are preferably connected by welding.

An external insulating member 12 is located on the outer side of the battery around the negative electrode terminal insertion hole 2b of the sealing plate 2. An internal insulating member 13 and a first negative electrode current collector 8a are located on the inner side of the battery around the negative electrode terminal insertion hole 2b of the sealing plate 2. After that, the negative electrode terminal 9 is inserted from the outside of the battery into the through hole of the external insulating member 12, the negative electrode terminal insertion hole 2b of the sealing plate 2, the through hole of the internal insulating member 13, and the through hole of the first negative electrode current collector 8a, and the end of the negative electrode terminal 9 is crimped onto the first negative electrode current collector 8a. Hence, the negative electrode terminal 9 and the first negative electrode current collector 8a are fixed to the sealing plate 2. Note that the crimped portion of the negative electrode terminal 9 and the first negative electrode current collector 8a are preferably connected by welding.

In the internal insulating member 11, a solution injection opening 11a is provided in a portion facing the electrolytic solution injection hole 15 provided in the sealing plate 2. A tubular part 11b is provided at the edge of the solution injection opening 11a.

[Connection Between First Current Collector and Second Current Collector]

Figure 9:
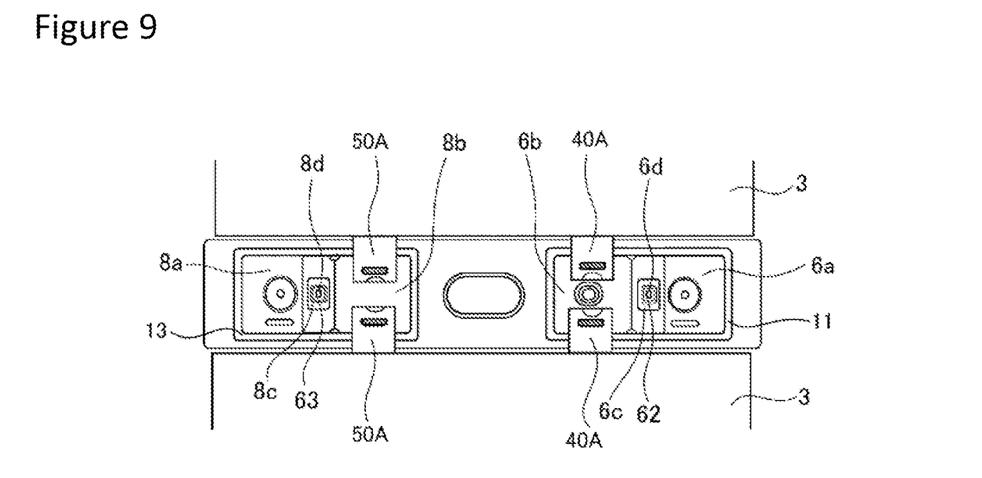
FIG. 9 is a diagram showing a surface of the sealing plate adjacent to the electrode assembly after the second positive electrode current collector is attached to the first positive electrode current collector and the second negative electrode current collector is attached to the first negative electrode current collector.

FIG. 9 shows the inside of the battery of the sealing plate 2 after the second positive electrode current collector 6b is mounted to the first positive electrode current collector 6a and the second negative electrode current collector 8b is mounted to the first negative electrode current collector 8a. The second positive electrode current collector 6b to which the positive electrode tab group 40A is connected is located on the internal insulating member 11 so that a part thereof overlaps with the first positive electrode current collector 6a.

The thin portion 6c is irradiated with a laser beam, so that the second positive electrode current collector 6b and the first positive electrode current collector 6a are connected by welding, thereby forming a welded connection portion 62. The second negative electrode current collector 8b to which the negative electrode tab group 50A is connected is located on the internal insulating member 13 so that a part thereof overlaps with the first negative electrode current collector 8a. The thin portion 8c is irradiated with a laser beam, so that the second negative electrode current collector 8b and the first negative electrode current collector 8a are connected by welding, thereby forming a welded connection portion 63.

[Fabrication of Secondary Battery]

Two positive electrode tab groups 40A and two negative electrode tab groups 50A are curved so that the upper side of one electrode assembly 3 in FIG. 9 (the side further to the viewer in FIG. 9) and the upper side of the other electrode assembly 3 (the side closer to the viewer in FIG. 9) cone into contact with each other directly or via another member. As a result, the two electrode assemblies 3 are combined into one unit. The two electrode assemblies 3 are located in an electrode assembly holder 14 consisting of a box-shaped or a bag-shaped insulating sheet.

One positive electrode tab group 40A and the other positive electrode tab group 40A are curved in different directions. One negative electrode tab group 50A and the other negative electrode tab group 50A are curved in different directions. When the curved tab is connected to the current collector, the distance between a portion of the electrode plate closer to the first side of the tab of one electrode plate (the proximate end portion of the tab) and the other electrode plate tends to be short. Hence, if a big protrusion exists at the end of the core body near the first side of the tab, the protrusion may come into contact with the separator and damage the separator. For this reason, the thickness of the end of the core body near the first side of the tab is preferably made small.

The two electrode assemblies 3 wrapped in the electrode assembly holder 14 are inserted into the square exterior body 1. The sealing plate 2 and the square exterior body 1 are then welded to seal the opening of the square exterior body 1 with the sealing plate 2. The electrolytic solution is then injected into the square exterior body 1 through the electrolytic solution injection hole 15 provided in the sealing plate 2. After that, the electrolytic solution injection hole 15 is sealed with a sealing member 16 such as a blind rivet. Thus, the square secondary battery 20 is completed.

The protective layer provided on the electrode plate is preferably a layer having lower electrical conductivity than the core body constituting the electrode plate. The protective layer is preferably a layer having lower electrical conductivity than the active material layer. Although the aforementioned embodiment showed the example in which the protective layer is provided on the positive electrode plate, the protective layer may be provided on the negative electrode plate instead.

The protective layer preferably contains a ceramic and a binder. The ceramic may be an oxide, nitride, boride, carbide, silicide, sulfide or the like. The ceramic may be aluminum oxide, boehmite, titanium oxide, silicon oxide, tungsten oxide, or the like. However, this is not necessarily the case. The binder is preferably a resin-based binder. However, this is not necessarily the case. Note that the protective layer does not necessarily contain a ceramic. For example, the protective layer may be a resin layer. The protective layer may be made of a conductive material of a carbon material or the like. Note that the protective layer does not necessarily contain a conductive material.

The thickness of the protective layer is preferably 10 to 100 μm, more preferably 15 to 50 μm.

The positive electrode core body is preferably made of aluminum or an aluminum alloy containing aluminum as a main component. Note that the aluminum alloy is preferably an aluminum alloy with an aluminum content of 90 mass % or more, more preferably an aluminum alloy with an aluminum content of 95 mass % or more.

The negative electrode core body is preferably made of copper or a copper alloy containing copper as a main component. Note that the copper alloy is preferably a copper alloy with a copper content of 95 mass % or more, more preferably a copper alloy with a copper content of 99 mass % or more.

The thickness of the core body is preferably 5 to 30 μm, more preferably 5 to 20 μm.

The aforementioned embodiment showed the example in which the positive electrode protective layer 4c is provided on the positive electrode plate 4. However, the protective layer is not an essential component and is not necessarily provided.

When the electrode plate is not provided with a protective layer, the thickness of the end of the core body in the entire region of both ends with respect to the direction of the width of the tab (horizontal direction in FIG. 3C) can be made smaller than the thickness of the end of the core body on the first side.

The thickness of the end of the core body in the region of the tab that is much away from the first side (for example, the region that is 1 cm or more away from the first side in the direction in which the tab protrudes) can be made larger than the thickness of the end of the core body on the first side.

Although the aforementioned embodiment showed the example in which two electrode assemblies are located in the battery case, one or three or more electrode assemblies may be used. The electrode assemblies may be laminated electrode assemblies or wound electrode assemblies.

The details of the configuration of the end portion of the active material layer-free region have been described for the positive electrode plate in the aforementioned embodiment, and the same configuration can be applied to the negative electrode plate.

Although the example in which the positive electrode current collector and the negative electrode current collector are each composed of two parts has been described in the aforementioned embodiment, the positive electrode current collector and the negative electrode current collector may each be composed of one part.

Known materials can be used for the positive electrode plate, the negative electrode plate, the separator, the electrolyte, and the like.

REFERENCE SIGNS LIST 20 square secondary battery
1 square exterior body
2 sealing plate
2a positive electrode terminal insertion hole
2b negative electrode terminal insertion hole
100 battery case
3 electrode assembly
4 positive electrode plate
4A first side
4a positive electrode core body
4b positive electrode active material layer
4c positive electrode protective layer
4d positive electrode core body exposed portion
4x1, 4x2 protrusion
40 positive electrode tab
40A positive electrode tab group
400 positive electrode original plate
401 positive electrode original plate with tabs already formed
5 negative electrode plate
5a negative electrode core body
5b negative electrode active material layer
5c negative electrode core body exposed portion
50 negative electrode tab
50A negative electrode tab group
6 positive electrode current collector
6a first positive electrode current collector
6b second positive electrode current collector
6c thin portion
6d current collector opening
6e current collector through hole
7 positive electrode terminal
8 negative electrode current collector
8a first negative electrode current collector
8b second negative electrode current collector
8c thin portion
8d current collector opening
9 negative electrode terminal
10 external insulating member
11 internal insulating member
11a solution injection opening
11b tubular part
12 external insulating member
13 internal insulating member
14 electrode assembly holder
15 electrolytic solution injection hole
16 sealing member
17 gas discharge valve
60, 61, 62, 63 welded connection portion

The invention claimed is:

1. A secondary battery electrode plate having a metal core body and an active material layer on both opposite surfaces of the core body, wherein
the electrode plate has a first side and a tab that protrudes from the first side away from the active material layer when viewed in a thickness direction of the core body, the thickness direction being perpendicular to the both opposite surfaces of the core body,
the tab is a part of the core body,
the first side defines a first perimetric edge of the core body extending in a first direction perpendicular to the thickness direction of the core body,
the tab defines a pair of second perimetric edges of the core body each extending in a second direction perpendicular to the first direction and the thickness direction of the core body,
the tab includes an electrode core body portion free of an active material layer formed thereon and protruding from the first side in the second direction when viewed in the thickness direction,
the pair of second perimetric edges are respectively positioned on opposite ends of the electrode core body portion in the first direction when viewed in the thickness direction, the electrode core body portion being thinner than the pair of second perimetric edges, and a thickness of each of the pair of second perimetric edges at a proximate end portion of the tab directly adjacent to the first side is less than a thickness of the first perimetric edge.

2. The secondary battery electrode plate according to claim 1, wherein, in the tab, a protective layer is formed on a surface of the core body near the first side.

3. The secondary battery electrode plate according to claim 2, wherein the pair of second perimetric edges at the proximate end portion of the tab and the first perimetric edge of the core body have a portion uncovered with the protective layer.

4. A secondary battery comprising:
the electrode plate according to claim 1;
another electrode plate that has a polarity different from that of the electrode plate; and
a current collector electrically connected to the electrode plate, wherein
the tab is connected to the current collector in a curved state.

* * * * *